(12) United States Patent
Kanai

(10) Patent No.: US 7,864,250 B2
(45) Date of Patent: Jan. 4, 2011

(54) IMAGE PROCESSING APPARATUS AND METHOD THEREOF

(75) Inventor: Izumi Kanai, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 788 days.

(21) Appl. No.: 11/851,809

(22) Filed: Sep. 7, 2007

(65) Prior Publication Data

US 2008/0068510 A1    Mar. 20, 2008

(30) Foreign Application Priority Data

Sep. 12, 2006   (JP) .............................. 2006-247356

(51) Int. Cl.
*H04N 9/68* (2006.01)
*H04N 5/14* (2006.01)

(52) U.S. Cl. ........................ 348/645; 348/256; 348/672

(58) Field of Classification Search ................. 348/645, 348/671–672, 678–679, 255–256, 703, 223.1; 382/162, 167, 168, 169, 274; 358/501, 518, 358/520, 521, 522; 345/591, 600–601, 603–604; *H04N 9/68, 5/14*
See application file for complete search history.

(56) References Cited

U.S. PATENT DOCUMENTS

| | | | |
|---|---|---|---|
| 5,781,315 A | | 7/1998 | Yamaguchi |
| 6,111,607 A | * | 8/2000 | Kameyama ................. 348/256 |
| 6,747,694 B1 | * | 6/2004 | Nishikawa et al. ....... 348/229.1 |
| 6,754,381 B2 | | 6/2004 | Kuwata |
| 7,251,056 B2 | | 7/2007 | Matsushima |
| 7,409,083 B2 | | 8/2008 | Yano |
| 7,443,453 B2 | * | 10/2008 | Hsu et al. ................... 348/645 |
| 7,616,811 B2 | * | 11/2009 | Kalevo et al. .............. 382/167 |
| 2003/0142879 A1 | * | 7/2003 | Kim ........................... 382/274 |

FOREIGN PATENT DOCUMENTS

| | | |
|---|---|---|
| JP | 09-163164 A | 6/1997 |
| JP | 09-191474 A | 7/1997 |
| JP | 2698493 | 9/1997 |
| JP | 10-210299 A | 8/1998 |
| JP | 2000-316095 A | 11/2000 |
| JP | 2001-230941 A | 8/2001 |
| JP | 2001-346222 | 12/2001 |
| JP | 2002-369004 A | 12/2002 |
| JP | 2005-012450 A | 1/2005 |
| JP | 2005-039456 A | 7/2007 |

OTHER PUBLICATIONS

The above documents were cited in an Aug. 18, 2008 Office Action from the corresponding Japanese Patent Application No. 2006-247356.
The above references were cited in an Aug. 22, 2008 Japanese Office Action that issued in Japanese Patent Application 2006-247356.

* cited by examiner

*Primary Examiner*—Trang U Tran
(74) *Attorney, Agent, or Firm*—Cowan, Liebowitz & Latman, P.C.

(57) ABSTRACT

Color saturation in chroma correction is reduced. Hence, a two-dimensional histogram is generated in association with the luminance and chroma levels of an image for one frame. An ease of saturation of the image is calculated from the two-dimensional histogram. A chroma gain is set according to the ease of saturation. Color-difference signals undergo chroma correction according to the chroma gain k.

4 Claims, 25 Drawing Sheets

FIG. 11

| No. | R | G | B | ΔR | ΔG | ΔB |
|---|---|---|---|---|---|---|
| 0 | 0 | 0 | 0 | 0 | 0 | 0 |
| 1 | 0 | 0 | 64 | 0 | 0 | 57 |
| 2 | 0 | 0 | 128 | 0 | 0 | 113 |
| 3 | 0 | 0 | 192 | 0 | 0 | 170 |
| 4 | 0 | 0 | 255 | 0 | 0 | 226 |
| 5 | 0 | 64 | 0 | 0 | 26 | 0 |
| 6 | 0 | 64 | 64 | 0 | 19 | 19 |
| ...... | | | | ...... | | |
| 124 | 255 | 255 | 255 | 255 | 0 | 0 |

FIG. 15B

| Max | Mid | WEIGHT W |
|-----|-----|----------|
| R | G | 4 |
| R | B | 1 |
| G | R | 4 |
| G | B | 1 |
| B | R | 3 |
| B | G | 3 |

— CORRESPONDING TO AREA 70 (row: R, G, 4)
— CORRESPONDING TO AREA 71 (rows: R, B, 1 and G, R, 4)

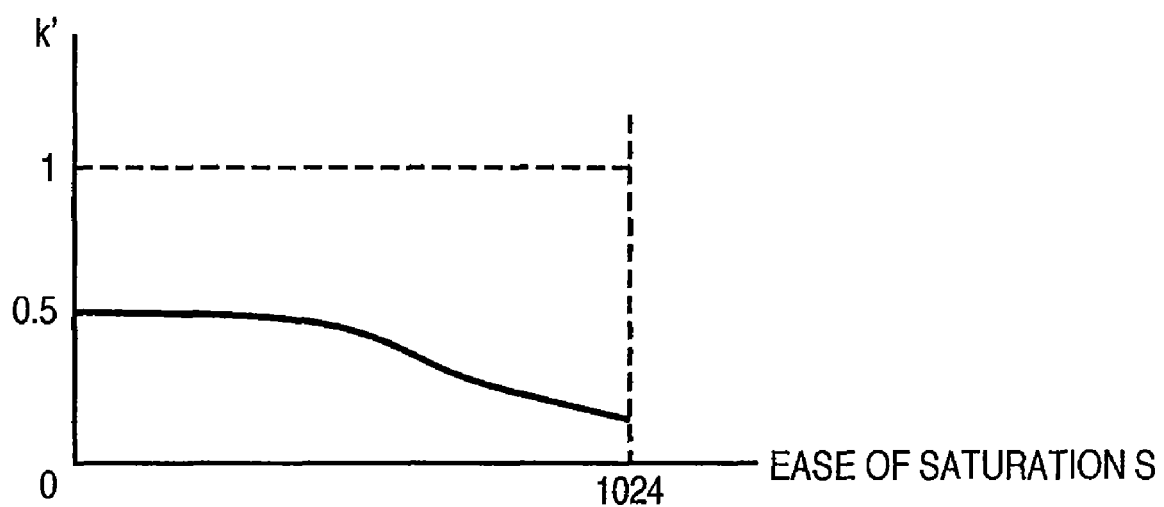
F I G. 16

IMAGE PROCESSING APPARATUS AND METHOD THEREOF

BACKGROUND OF THE INVENTION

1. Field of the Invention

The present invention relates to image processing for chroma-correcting an image.

2. Description of the Related Art

As a scheme for automatically adjusting a chroma level, a technique for changing a chroma gain designated by the user in accordance with the chroma level of an input image is available. This technique detects the chroma level of the input image for one frame, and executes processing for decreasing the user-designated chroma gain if the chroma level is high (for example, Japanese Patent No. 2698493).

However, since the technique of Japanese Patent No. 2698493, detects only a chroma component of an input signal but does not detect any luminance component, it may cause color saturation due to chroma emphasis. FIG. 1 is a graph for explaining this color saturation problem; the abscissa plots the chroma level of an input signal, and the ordinate plots the luminance level of the input signal.

A triangular area shown in FIG. 1 represents an expressible range (to be referred to as a "gamut" hereinafter) of the input signal. Area 1 corresponds to a high-chroma area. Area 2 indicates a chroma area which includes nearly middle chroma levels (to be referred to as "middle chroma levels" hereinafter) and is located near the gamut boundary on the high-luminance side. Area 3 indicates a chroma area which includes middle chroma levels and is located near the gamut boundary on the low-luminance side.

The technique of Japanese Patent No. 2698493, lowers the chroma gain if an input image has a high chroma level. Therefore, the chroma gain of a high-chroma input image whose chroma level belongs to area 1 is lowered, thus preventing or eliminating color saturation. However, the technique of Japanese Patent No. 2698493, does not lower the chroma gain for colors which belong to areas 2 and 3 which do not include any high chroma levels. For this reason, colors which belong to areas 2 and 3 are emphasized by the user-designated chroma gain, and shift in directions indicated by the arrows in FIG. 1. Then, the signal values of colors which deviate from the gamut of an input signal as a result of chroma emphasis are limited to the gamut boundaries, thus causing color saturation.

Also, there is a technique for compressing the values of an image signal to a range between expressible maximum and minimum values when the chroma adjustment result overshoots or undershoots the expressible range (for example, Japanese Patent Laid-Open No. 2001-346222).

However, according to the technique of Japanese Patent Laid-Open No. 2001-346222, colors near the gamut boundaries, in other words, colors in areas 1, 2, and 3 are not so chroma-emphasized, and colors other than those colors undergo strong chroma emphasis. Since this chroma emphasis processing is applied for each pixel, the chroma levels of the entire image shift to the vicinity of the gamut boundaries, and details of colors near the gamut boundaries may be lost.

Since the techniques of both Japanese Patent No. 2698493, and Japanese Patent Laid-Open No. 2001-346222, control chroma emphasis regardless of the gamut of a display apparatus, they suppress the chroma emphasis strength of even colors displayable due to a broad gamut of the display apparatus, and cannot obtain a chroma correction result desirable to the user.

SUMMARY OF THE INVENTION

In one aspect, an image processing method comprising the steps of: generating a histogram associated with luminance and chroma levels of one image data; calculating an ease of saturation of the image data based on the histogram; setting a chroma gain in accordance with the ease of saturation; and applying chroma correction to the image data in accordance with the chroma gain.

According to the aspect, color saturation in chroma correction can be reduced. Also, loss of details due to the chroma shift of an image toward the high-chroma side can be reduced. Furthermore, chroma correction can be executed in consideration of the relationship between the input and output gamuts.

Further features of the present invention will become apparent from the following description of exemplary embodiments with reference to the attached drawings.

BRIEF DESCRIPTION OF THE DRAWINGS

FIG. 11 shows an example of a table stored in a ROM;

FIG. 15B is a table showing a setting example of the weight value W;

FIG. 16 is a graph showing the conversion characteristics of a gain table;

DESCRIPTION OF THE EMBODIMENTS

An image processing apparatus according to the preferred embodiments of the present invention will be described in detail hereinafter with reference to the accompanying drawings. Note that the image processing apparatus according to this embodiment can be implemented in a display apparatus such as a digital television or the like, and a recording/playback apparatus such as a hard disk drive (HDD) recorder or the like. Therefore, assume that an image which is to undergo chroma emphasis processing in this embodiment is image data for one frame in video data. That is, the chroma emphasis processing of the present invention is uniformly executed for an image data unit as a set of a plurality of pixel signals. Note that the chroma emphasis processing according to the present invention can be applied not only to a moving image signal but also to a still image signal to be input to a printer or the like.

First Embodiment

[Arrangement of Apparatus]

Figure 1:
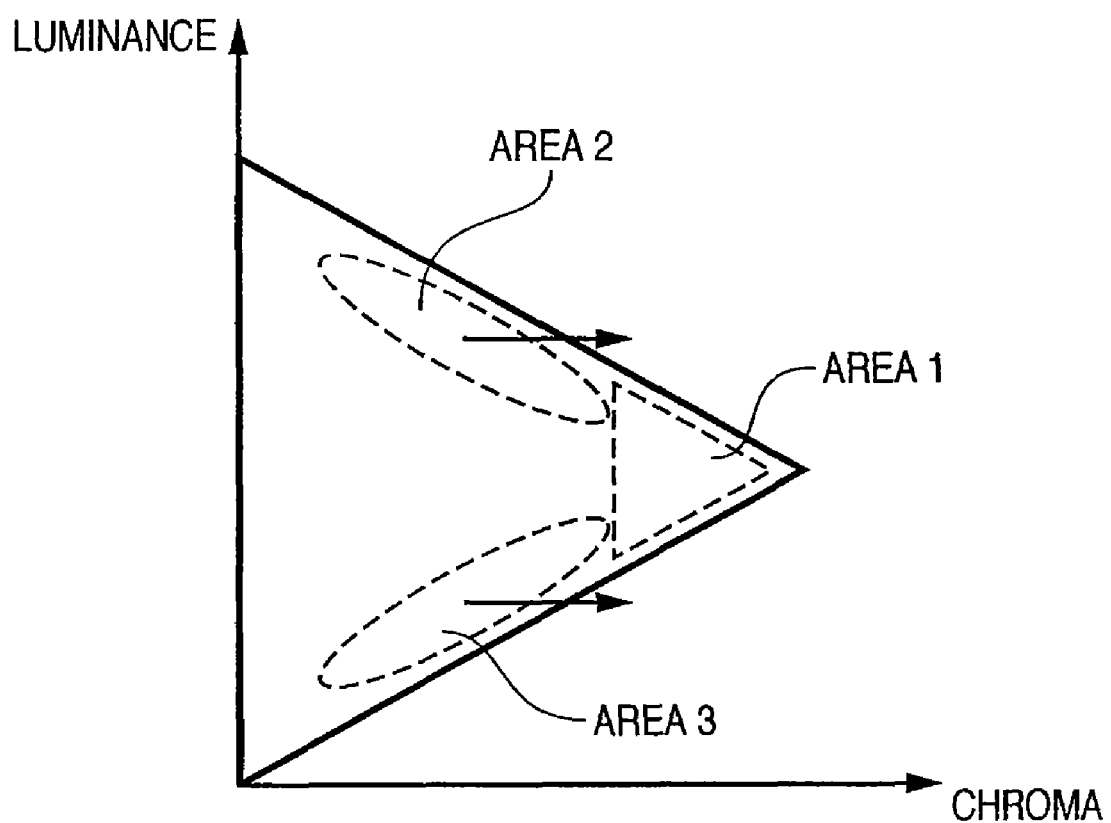
FIG. 1 is a graph for explaining the problem of color saturation.
Figure 2:
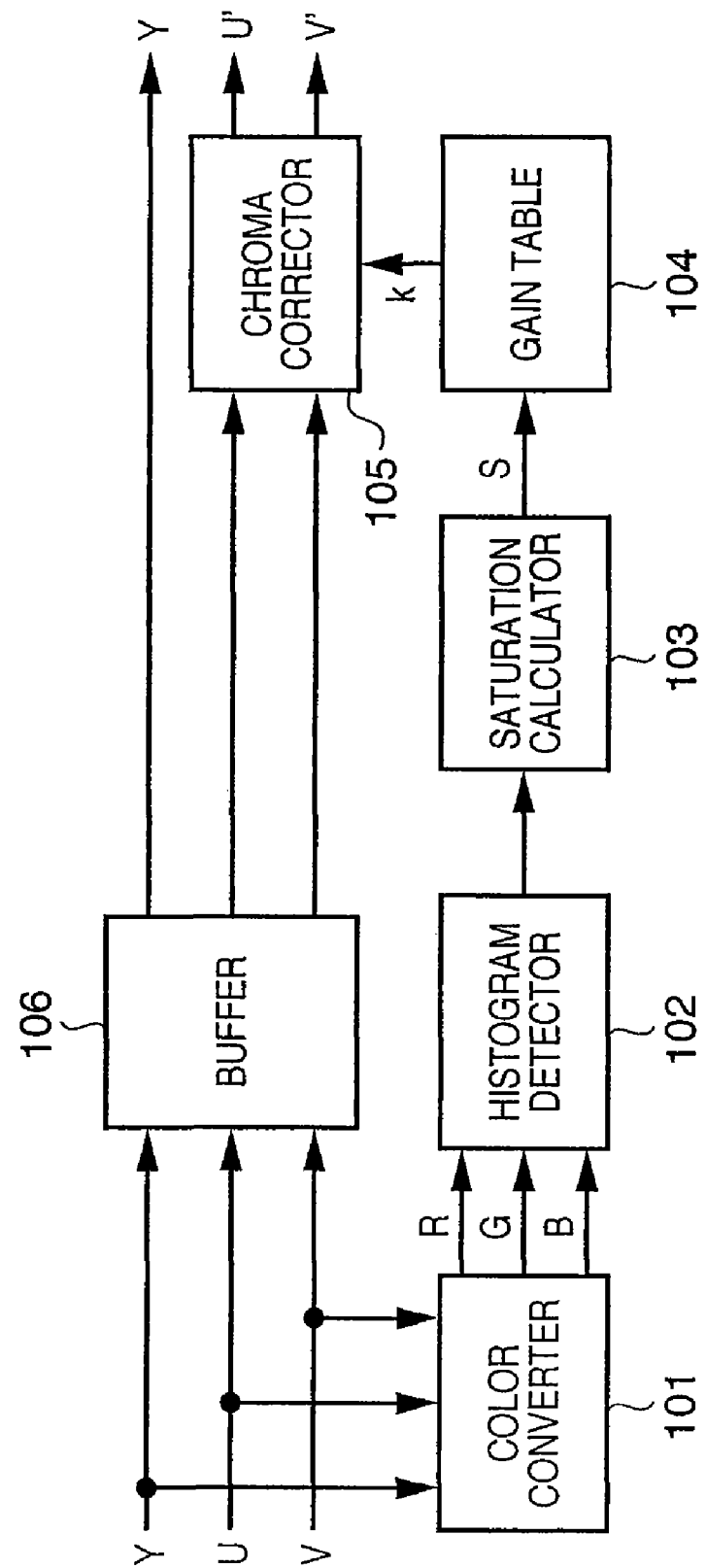
FIG. 2 is a block diagram showing the arrangement of an image processing apparatus according to one embodiment.

FIG. 2 is a block diagram showing the arrangement of an image processing apparatus according to this embodiment. In the first embodiment, assume that YUV signals are adopted as input signals.

A color converter 101 converts input YUV signals into RGB signals. As this conversion, for example, 3×3, matrix operations can be made. A histogram detector 102 receives the RGB signals and generates a 2D histogram. A saturation calculator 103 receives the 2D histogram, and calculates an ease of saturation S based on the 2D histogram. A gain table 104 receives the ease of saturation S and outputs a chroma gain k corresponding to the ease of saturation S. A chroma corrector 105 applies chroma correction to color-difference signals U and V output from a buffer 106 using the chroma gain k, and outputs signals U' and V'.

[Histogram Detector]

Figure 3:
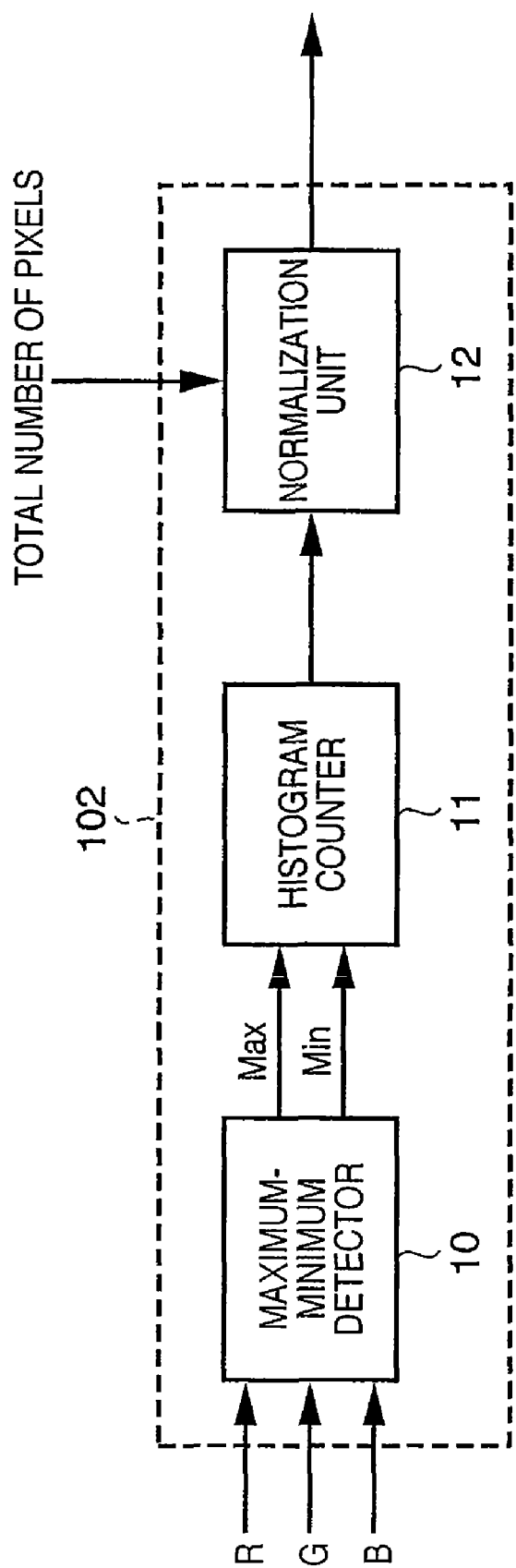
FIG. 3 is a block diagram showing the arrangement of a histogram detector.

FIG. 3 is a block diagram showing the arrangement of the histogram detector 102.

A maximum-minimum detector 10 detects a color component signal indicating a maximum value Max and that indicating a minimum value Min for each pixel from the input RGB signals. A histogram counter 11 receives signals of the maximum and minimum values Max and Min, and generates a 2D histogram of image data which is to undergo chroma correction processing (image data for one frame in this embodiment).

Figure 4:
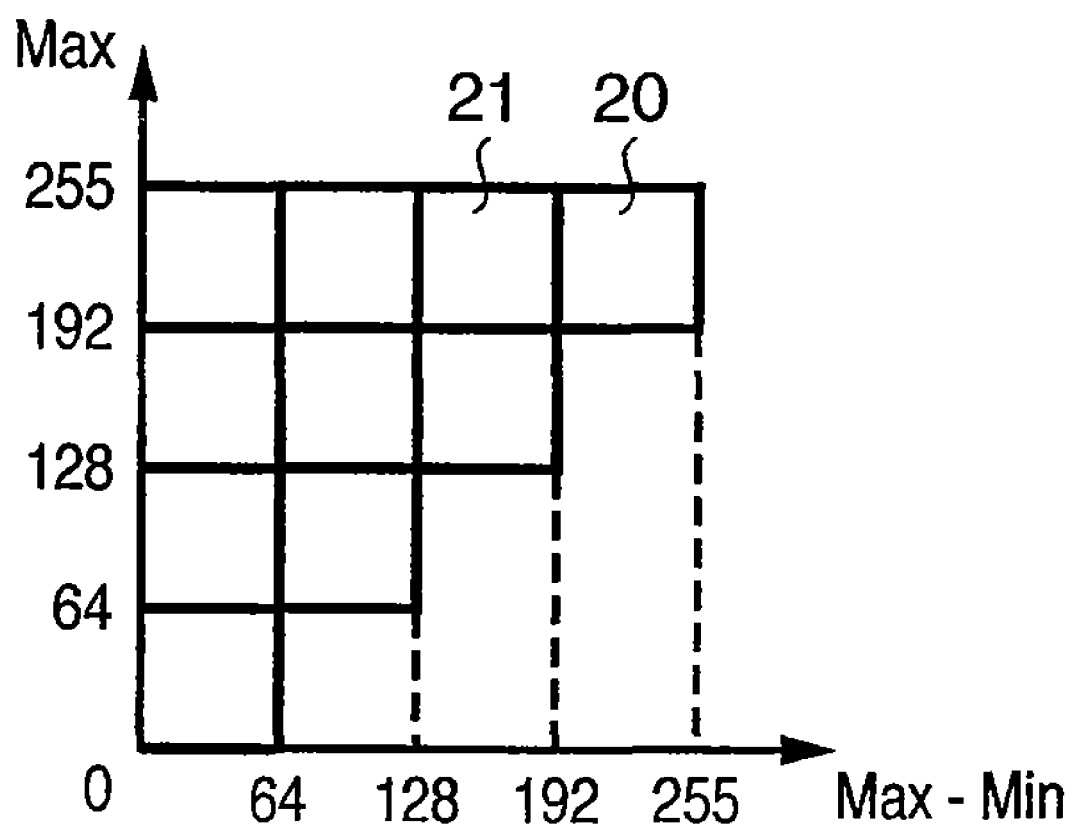
FIG. 4 is a graph showing an example of a two-dimensional (2D) histogram.

FIG. 4 shows an example of the 2D histogram; the abscissa plots differences Max-Min between the maximum and minimum values Max and Min, and the ordinate plots the maximum values Max. Note that the difference Max-Min on the abscissa is a parameter corresponding to the chroma level, and the maximum value Max on the ordinate is a parameter corresponding to the luminance level. However, the axes of the 2D histogram are not limited to these, and other parameters corresponding to the chroma and luminance levels may be used.

Assume that the RGB signals input to the histogram detector 102 are expressed by 8-bits of data (0, to 255) per color. In this case, the divisions of the abscissa and ordinate of the 2D histogram are set to cover 0, to 63, 64, to 127, 128, to 191, and 192, to 255 obtained by nearly equally dividing the data range into four. Therefore, the histogram counter 11 counts the frequencies of occurrence for 10 respective divided blocks shown in FIG. 4.

For example, when RGB data of a certain pixel are R=200, G=100, and B=0, Max=200, and Max-Min=200, this pixel belongs to a divided block 20, and the histogram counter 11 increments the frequency of occurrence of the divided block 20. In this manner, the histogram counter 11 generates a 2D histogram for one frame.

A normalization unit 12 receives the 2D histogram, and normalizes the 2D histogram according to the resolution of the input image. That is, the sum total of frequencies of occurrence of the respective divided blocks of the 2D histogram is equal to the total number of pixels for one frame. Therefore, when the resolution of the input image changes, the sum total of frequencies of occurrence also changes. If the sum total of frequencies of occurrence changes depending on the resolution, subsequent processing must be changed depending on the resolution, resulting in troublesome processing. Hence, the frequencies of occurrence are normalized (divided) by the number of pixels for one frame to make the sum total of frequencies of occurrence constant without being influenced by the resolution. In the first embodiment, the 2D histogram is normalized so that the sum total of frequencies of occurrence after normalization is 63.

The histogram detector 102 outputs the 2D histogram after normalization.

[Saturation Calculator]

Figure 5:
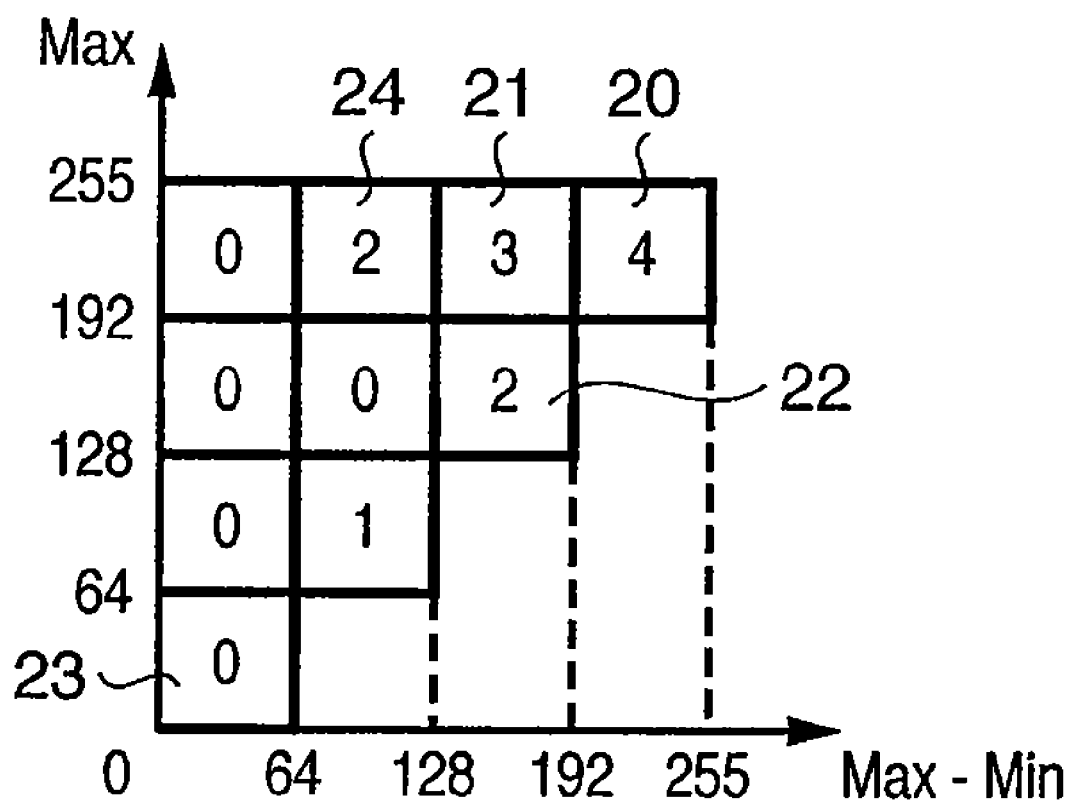
FIG. 5 is a graph showing the relationship between the 2D histogram and coefficients.

FIG. 5 shows the relationship between the 2D histogram and coefficients. The saturation calculator 103 multiplies the frequencies of occurrence of the respective divided blocks of the 2D histogram by coefficients 0 to 4 (values described in cells of the divided blocks) set for respective divided blocks.

The coefficients assume larger values for divided blocks which suffer larger influences of color saturation upon execution of chroma emphasis. For example, a largest coefficient "4" is assigned to the divided block 20 shown in FIG. 5. This is because a pixel which belongs to the divided block 20 suffers the largest influence of color saturation as a result of chroma emphasis.

A divided block 21 has the same chroma level (a division of the same Max-Min value) as a divided block 22. However, a pixel which belongs to the divided block 21 suffers a larger influence of color saturation upon chroma emphasis than a pixel which belongs to the divided block 22. The influence of color saturation of a color which is saturated toward the high-luminance side readily stands out rather than that which is saturated toward the low-luminance side. Hence, a coefficient "3" is assigned to the divided block 21, and a coefficient "2" is assigned to the divided block 22, so that the coefficient of the divided block 21 is larger.

A divided block 24 corresponds to a middle chroma level and the vicinity of the gamut boundary. In case of chroma emphasis, a pixel which is located near the gamut boundary readily suffers the influence of color saturation even if it has a middle chroma level. Hence, a relatively larger coefficient "2" is set for the divided block 24.

Pixels which normally do not cause any color saturation due to chroma emphasis belong to divided blocks (e.g., a block 23) with a coefficient "0" shown in FIG. 5.

The saturation calculator 103 multiplies the frequencies of occurrence of the 10 divided blocks by the coefficients of these blocks, and calculates a sum total of the products of all the blocks as the ease of saturation S. Then, the saturation calculator 103 outputs the ease of saturation S once per frame. Note that the ease of saturation S is expressed by:

$$S = \Sigma_{i=0}^{9}, his(i) \times C(i) \qquad (1)$$

where his(i) is the frequency of occurrence of divided block i, and

C(i) is the coefficient of divided block i.

The ease of saturation S assumes a larger value with increasing frequency of occurrence of the divided block with a large coefficient C shown in FIG. 5. That is, an image which suffers a larger influence of color saturation upon chroma emphasis assumes a larger value of the ease of saturation S. The range that the value of the ease of saturation S can assume is as follows.

In case of a low-chroma image in which all pixels for one frame belong to the divided block 23 shown in FIG. 5, the ease of saturation S is 0, (=63 (the sum total of the frequencies of occurrence after normalization)×0). On the other hand, in case of a high-chroma image in which all pixels for one frame belong to the divided block 20 shown in FIG. 5, the ease of saturation S is 252 (=63×4).

[Gain Table]

Figure 6:
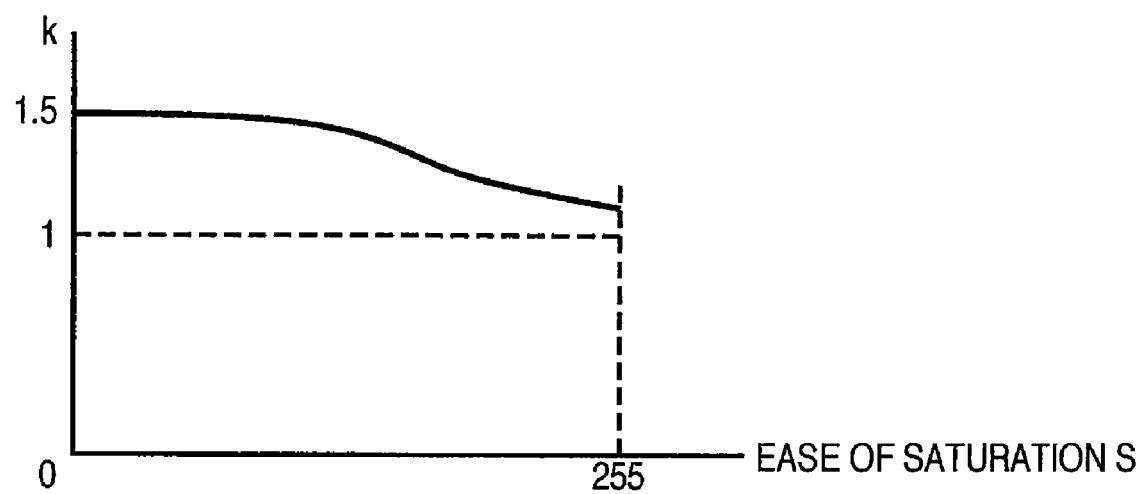
FIG. 6 is a graph showing the conversion characteristics of a gain table.

FIG. 6 shows the conversion characteristics of the gain table 104; the abscissa plots the ease of saturation S, the ordinate plots a gain k, and the solid curve represents the conversion characteristics. The conversion characteristics are set so that when the ease of saturation is zero, in other words, in the case of an image for which color saturation is hardest to occur, the chroma gain is set to be a maximum value (e.g., k=1.5), and the chroma gain k monotonically decreases with increasing ease of saturation S.

[Chroma Corrector]

Figure 7:
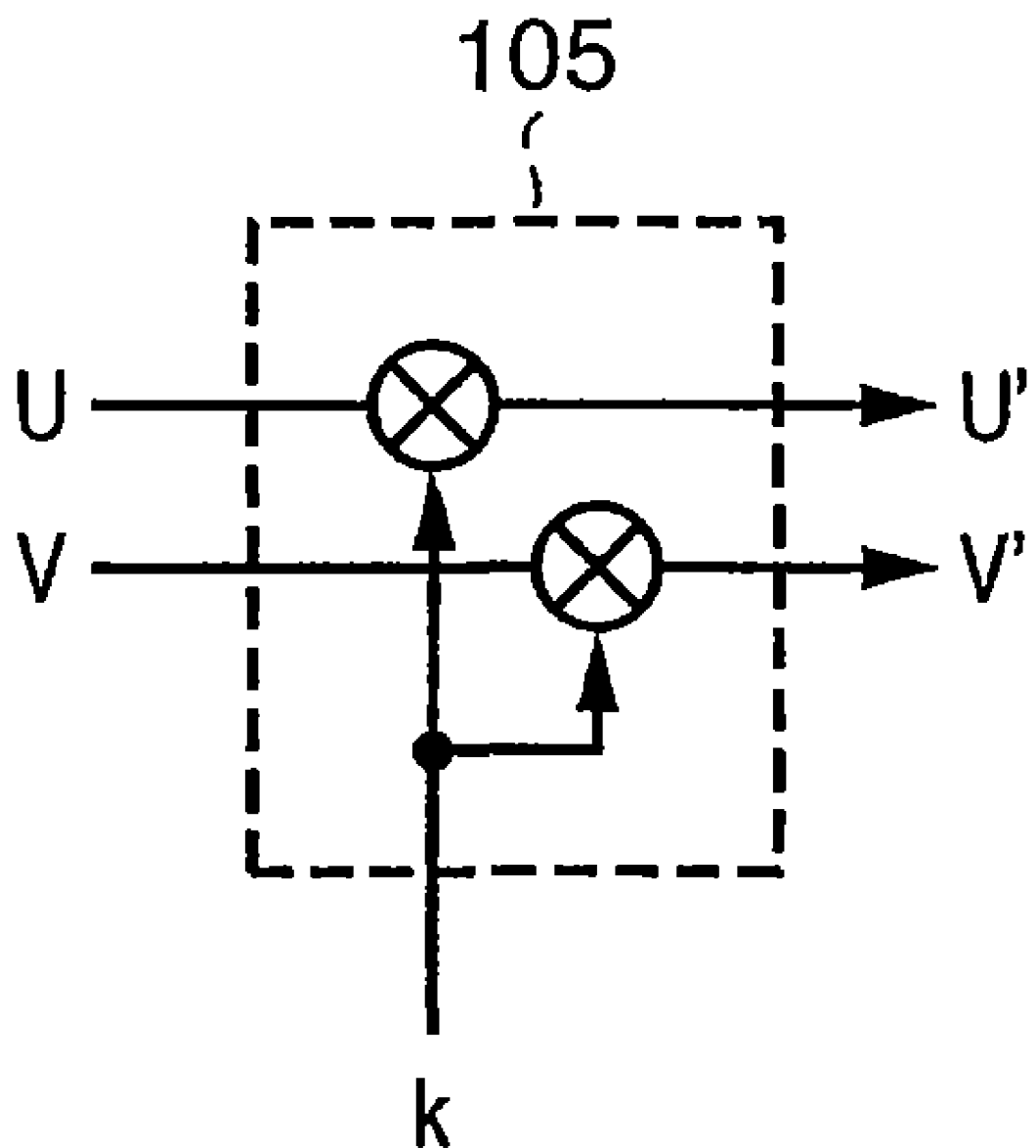
FIG. 7 is a block diagram showing an example of the arrangement of a chroma corrector.

FIG. 7 is a block diagram showing the arrangement of the chroma corrector 105. The chroma corrector executes chroma correction by multiplying color-difference signals U and V output from the buffer 106 by the same chroma gain k. Therefore, the chroma level is emphasized more with increasing chroma gain k.

In this manner, when the ease of saturation S calculated based on the relationship between the chroma and luminance levels is large, in other words, in the case of an image which suffers a large influence of color saturation upon chroma emphasis, a small chroma gain k is set. On the other hand, when the ease of saturation S is small, in other words, in the case of an image which suffers less influence of color saturation upon chroma emphasis, a large chroma gain k is set to apply chroma correction. Therefore, not only colors in a high-chroma area, but also colors in a middle-chroma area and near the gamut boundary, those in the middle-chroma area and far from the gamut boundary, and those in a low-chroma area can be detected. According to the detection result, the chroma gain k is set to apply chroma correction, thus eliminating the influence of color saturation.

Irrespective of chroma areas to which an image belongs, an image for one frame undergoes chroma correction using a uniform chroma gain. Therefore, the saturation levels of the entire image shift to the vicinity of the gamut boundary, and details of colors near the gamut boundary are never lost.

Second Embodiment

An image processing apparatus according to the second embodiment of the present invention will be described hereinafter. Note that the same reference numerals in the second embodiment denote the same components as in the first embodiment, and a detailed description thereof will not be given.

Figure 8:
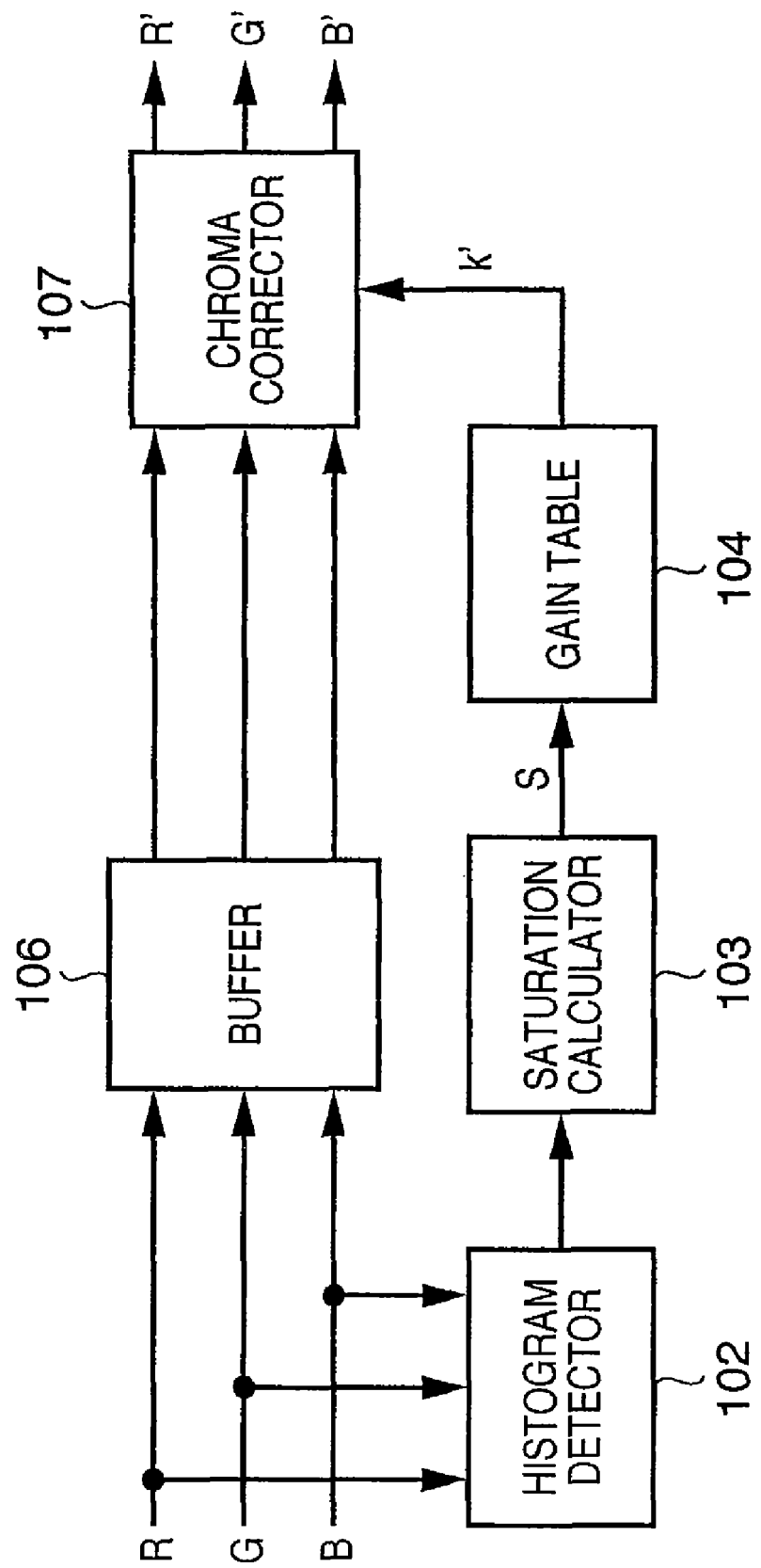
FIG. 8 is a block diagram showing the arrangement of an image processing apparatus according to the second embodiment.

The image processing apparatus according to the second embodiment receives RGB signals, and applies chroma correction to the RGB signals. FIG. 8 is a block diagram showing the arrangement of the image processing apparatus of the second embodiment. The differences between the image processing apparatus of the second embodiment and that of the first embodiment are the conversion characteristics of the gain table 104, and the arrangement of a chroma corrector 107.

Figure 9:
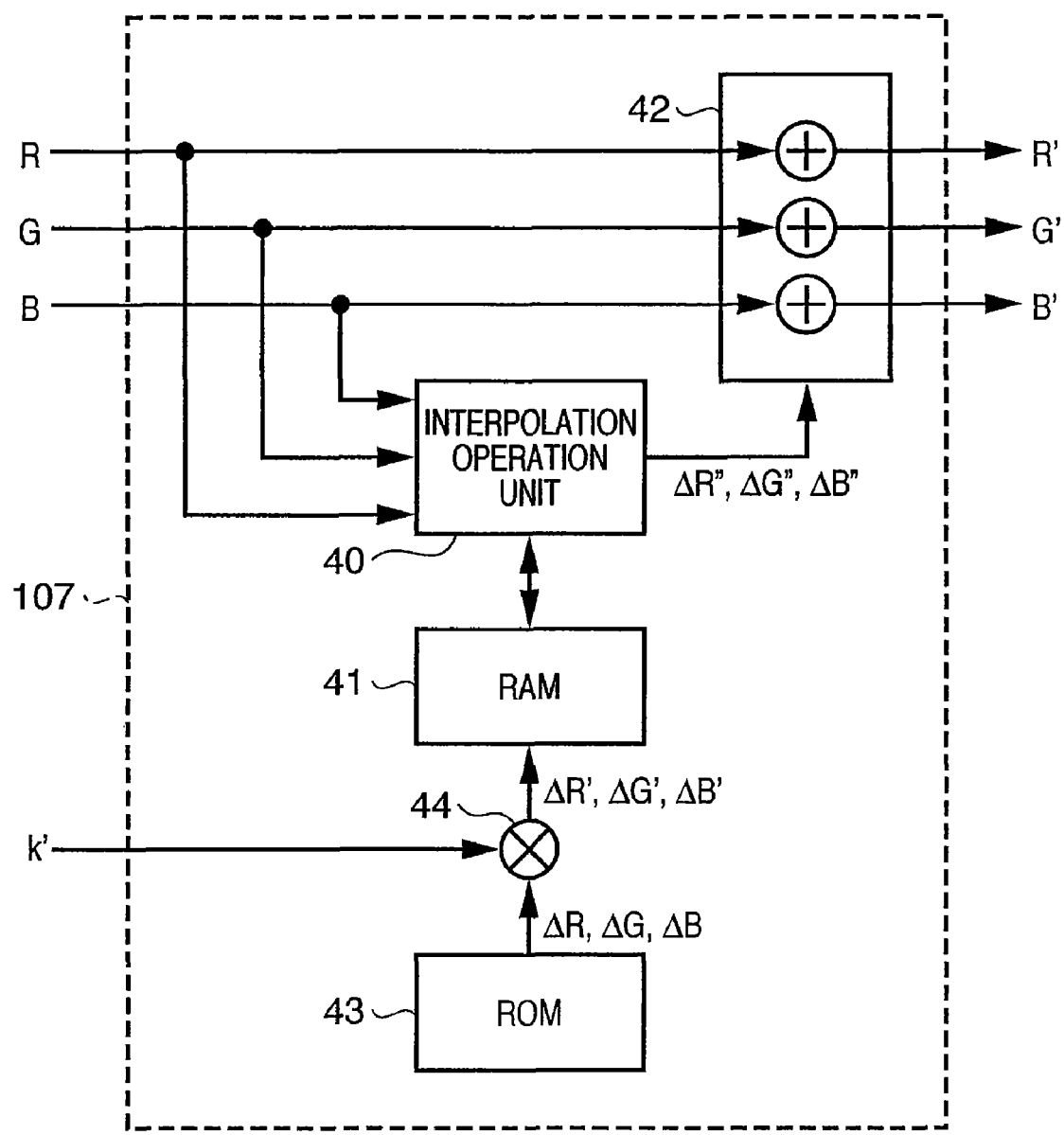
FIG. 9 is a block diagram showing the arrangement of a chroma corrector.

FIG. 9 is a block diagram showing the arrangement of the chroma corrector 107.

Figure 10:
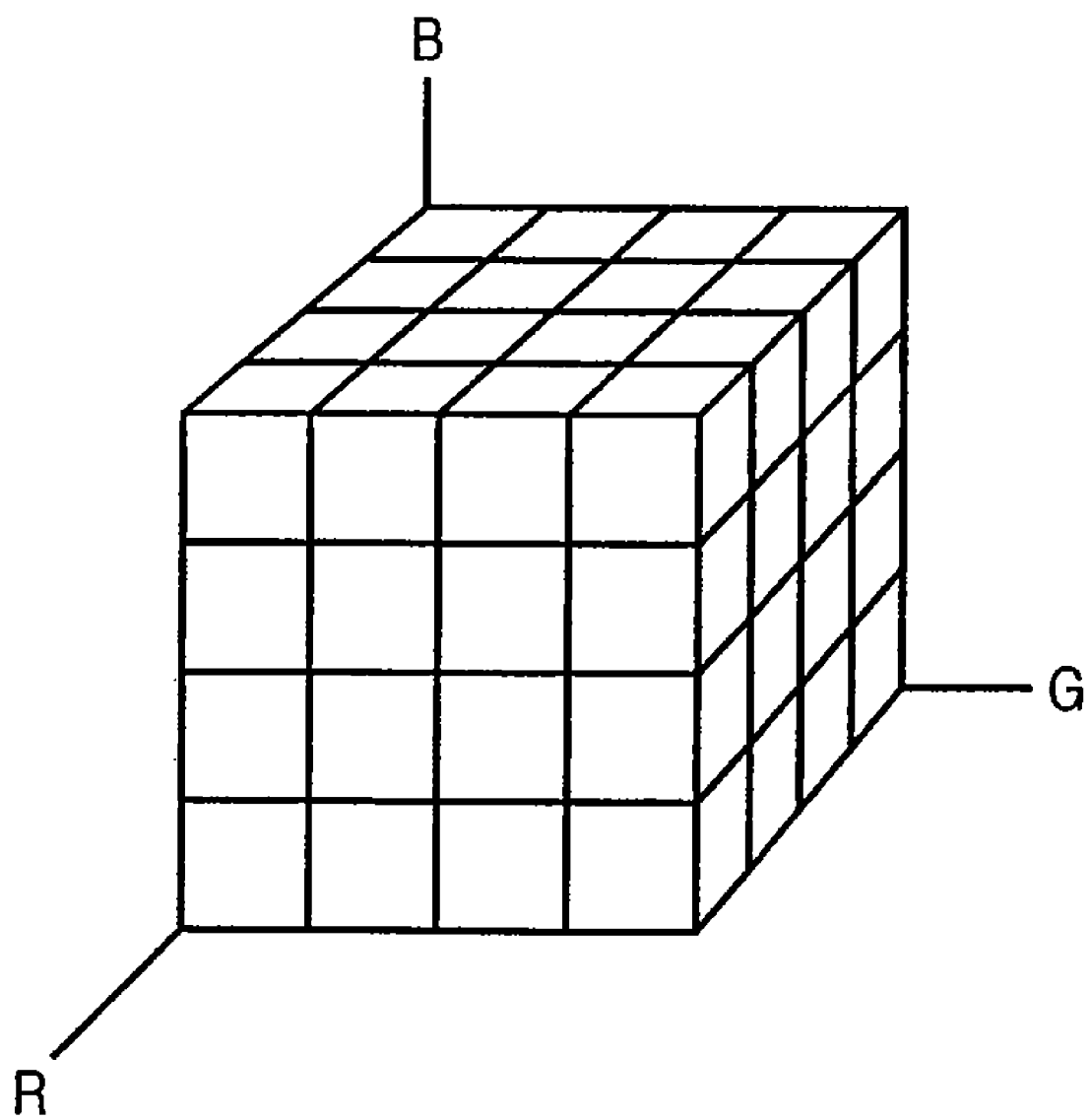
FIG. 10 shows a table corresponding to an RGB color space divided into 5×5×5.

FIG. 10 shows a table which is stored in a ROM 43 and corresponds to an RGB color space divided into 5×5×5. That is, the ROM 43 stores output data corresponding to input data at grids (5×5×5=125 grids) shown in FIG. 10.

FIG. 11 shows an example of a three-dimensional lookup table (3DLUT) stored in the ROM 43 when RGB signals are expressed using 8, bits per color. That is, the 3DLUT describes the relationship between input RGB signal values corresponding to respective grids, and differences (ΔR, ΔG, ΔB) between the input and output RGB signal values.

The difference data ΔR, ΔG, and ΔB are generated, for example, as follows. Initially, RGB data at 125, grids undergo color space conversion into YUV data, as described by:

$$\begin{bmatrix} Y \\ U \\ V \end{bmatrix} = \begin{bmatrix} 0.299 & 0.587 & 0.114 \\ -0.169 & -0.331 & 0.500 \\ 0.500 & -0.419 & -0.081 \end{bmatrix} \begin{bmatrix} R \\ G \\ B \end{bmatrix} \qquad (2)$$

Next, $YU_1V_1$, data obtained, for example, by doubling the values of color-difference signals U and V, as shown in FIG. 6, undergo color space conversion again into R'G'B' data, as described by:

$$\begin{bmatrix} R' \\ G' \\ B' \end{bmatrix} = \begin{bmatrix} 1.000 & 0 & 1.402 \\ 1.000 & -0.344 & -0.714 \\ 1.000 & 1.772 & 0 \end{bmatrix} \begin{bmatrix} Y \\ U_1 \\ V_1 \end{bmatrix} \qquad (3)$$

Then, difference data ΔR, ΔG, and ΔB are calculated by:

$$\begin{bmatrix} \Delta R \\ \Delta G \\ \Delta B \end{bmatrix} = \begin{bmatrix} R' \\ G' \\ B' \end{bmatrix} - \begin{bmatrix} R \\ G \\ B \end{bmatrix} \qquad (4)$$

In this manner, the differences (ΔR, ΔG, ΔB) for 125, grids when the color-difference signals U and V are multiplied by the chroma gain k are obtained.

A multiplier 44 multiplies the differences (ΔR, ΔG, ΔB) for the respective grids read out from the ROM 43 by a chroma gain correction coefficient k' output from the gain table 104. If k'=1, $U_1$=2U, and $V_1$=2V, the differences (ΔR', ΔG', ΔB') between output RGB signals upon multiplying the color-difference signals U and V by the chroma gain k=2, and input RGB signals are obtained. In other words, when the chroma gain correction coefficient k' for one frame is controlled to be less than 1, in accordance with the ease of saturation S calculated based on the relationship between the chroma and luminance levels, chroma correction can be controlled in accordance with the chroma levels of an image for one frame.

A RAM 41 is a 5×5×5 3DLUT which stores the differences (ΔR', ΔG', ΔB') for respective grids output from the multiplier 44.

An interpolation operation unit 40 calculates, for example, by linear interpolation operations, differences (ΔR", ΔG", ΔB") between the RGB signals input from the buffer 106 and those input from a difference vector table stored in the RAM 41. That is, the unit 40 reads out differences (ΔR', ΔG', ΔB') for eight grids which surround the input RGB signals. Then, the unit 40 calculates the weighted means of the differences (ΔR', ΔG', ΔB') for the eight grids in accordance with the distances between the input RGB signals and the eight grids to obtain differences (ΔR", ΔG", ΔB") for the input RGB signals.

An adder 42 adds the differences ΔR", ΔG", and ΔB" to the input RGB signals, respectively, to execute chroma correction, and outputs R'G'B' signals.

As described above, the conversion characteristics of the gain table 104 are slightly different from those of the first embodiment. The gain table 104 of the first embodiment outputs the chroma gain k to be multiplied by the color-difference signals U and V. By contrast, the gain table 104 of the second embodiment outputs the chroma gain correction coefficient k' to be multiplied by the differences (ΔR, ΔG, ΔB).

Figure 12:
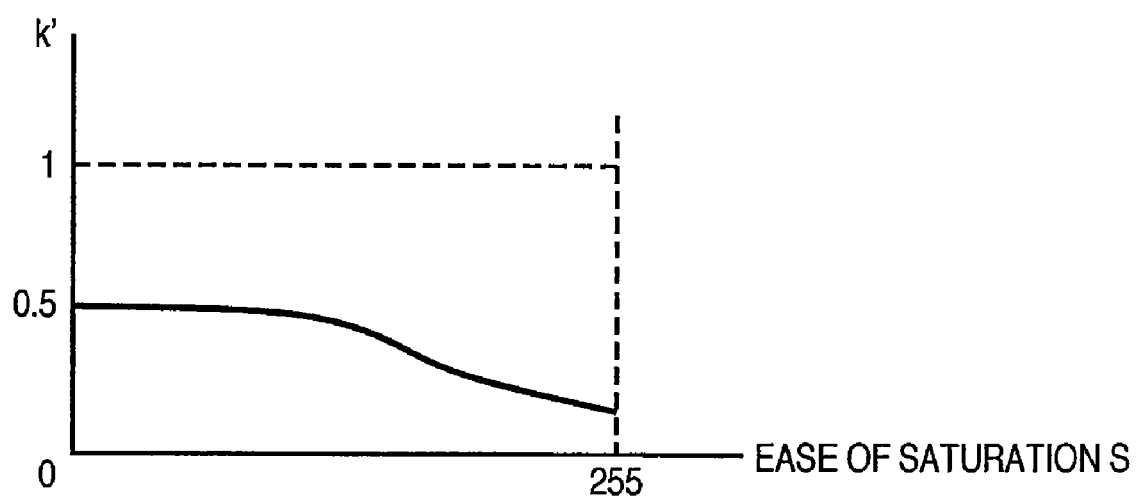
FIG. 12 is a graph showing the conversion characteristics of a gain table.

FIG. 12 shows the conversion characteristics of the gain table 104. In order to yield a result close to the case of the chroma gain k=1.5, when the ease of saturation S is zero as in the first embodiment, if $U_1=2U$ and $V_1=2V$, k'=0.5, is set. With the characteristics shown in FIG. 12, the chroma gain correction coefficient k' monotonically decreases with increasing ease of saturation S.

As described above, the same chroma correction as in the first embodiment can be applied to RGB signals. Of course, the second embodiment can provide the same effects as in the first embodiment.

Third Embodiment

Image processing according to the third embodiment of the present invention will be described hereinafter. Note that the same reference numerals in the third embodiment denote the same components as those in the first and second embodiments, and a detailed description thereof will not be repeated.

Figure 13:
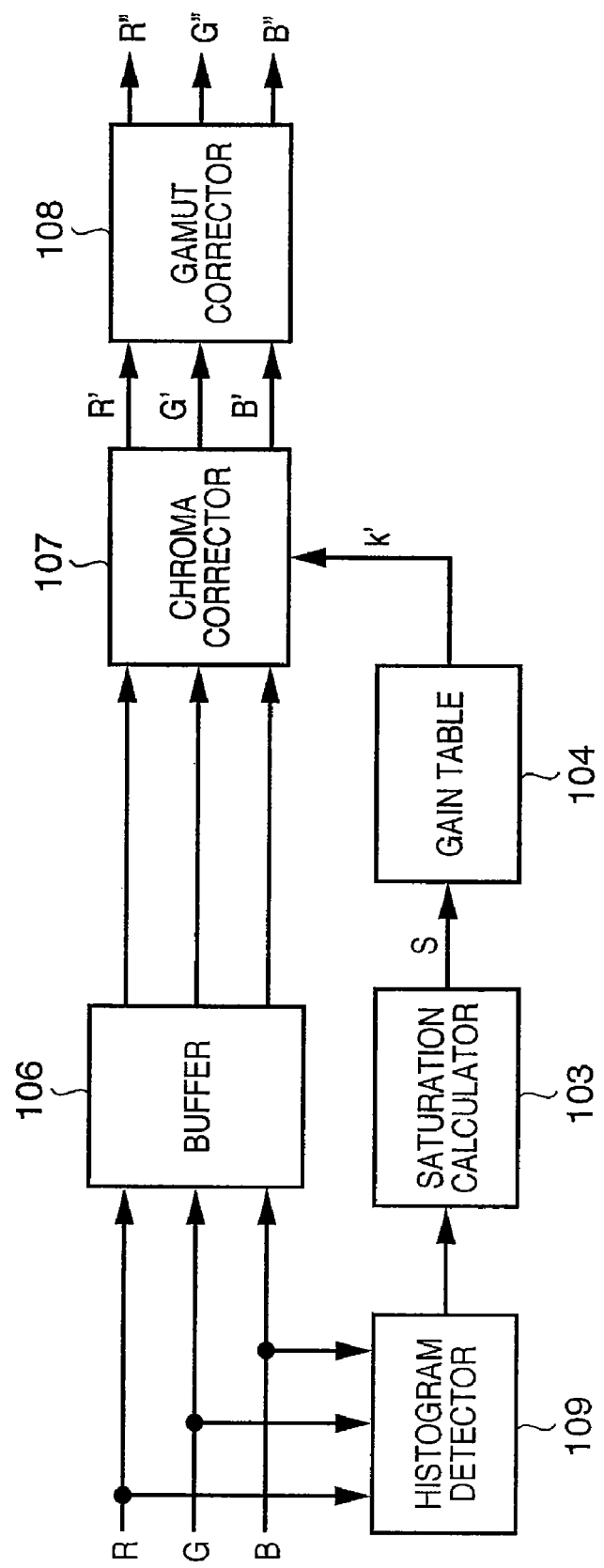
FIG. 13 is a block diagram showing the arrangement of an image processing apparatus according to the third embodiment.

The third embodiment will explain an example in which chroma correction is applied in consideration of the gamut of an image output device such as a display device or the like. FIG. 13 is a block diagram showing the arrangement of an image processing apparatus according to the third embodiment. Differences from the arrangement of the second embodiment are a histogram detector 109 and gamut corrector 108.

Figure 14:
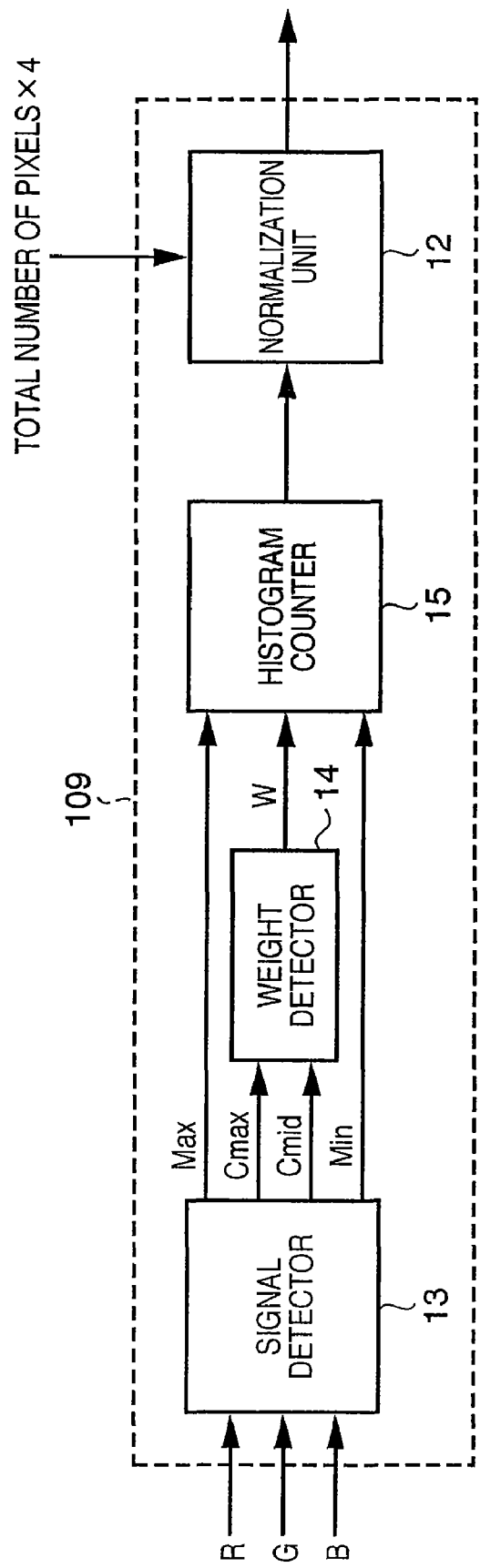
FIG. 14 is a block diagram showing the arrangement of a histogram detector.

FIG. 14 is a block diagram showing the arrangement of the histogram detector 109.

A signal value detector 13 outputs a color component signal indicating a maximum value Max and that indicating a minimum value Min for each pixel from the input RGB signals. Also, the detector 13 outputs signals indicating a color component Cmax of the maximum value Max and a color component Cmid of a middle value Mid. A weight detector 14 receives the signals Cmax and Cmid indicating the color components of the maximum value Max and middle value Mid, and outputs a weight value W. A histogram counter 15 receives the signals of the maximum and minimum values Max and Min, and the weight value W.

Figure 15A:
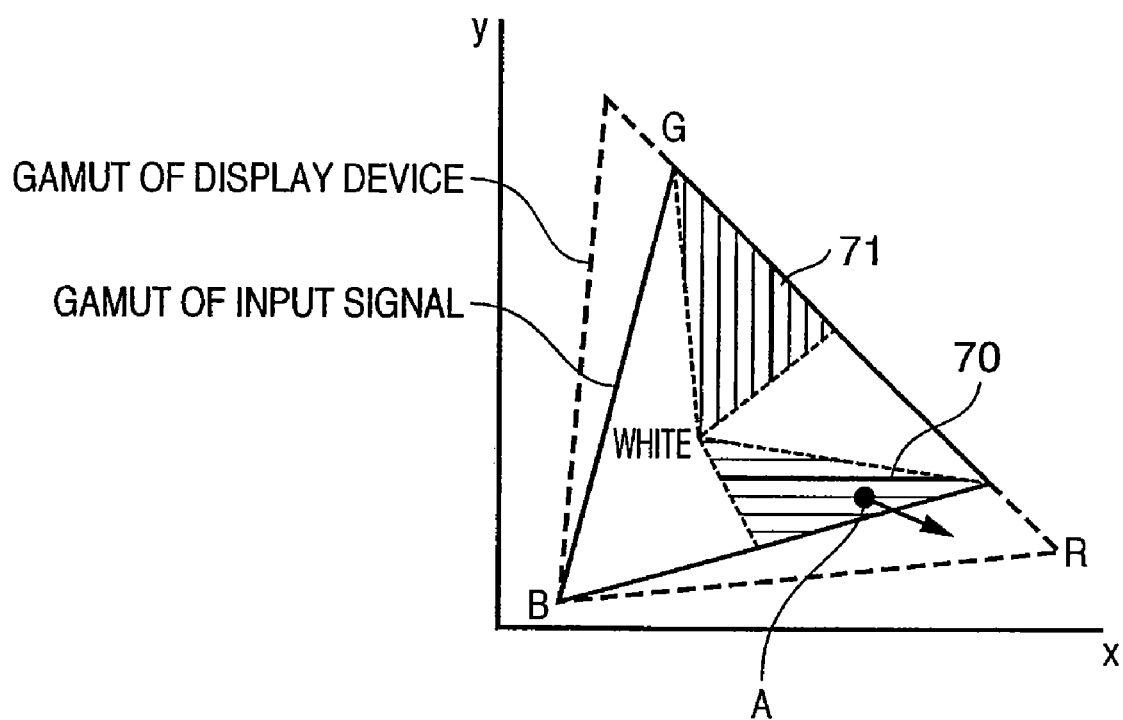
FIG. 15A is an xy-chromaticity diagram for explaining a weight value W.

FIG. 15A is an xy-chromaticity diagram for explaining the weight value W. A broken-line triangle represents an example of the gamut of an image output device (to be referred to as an "output gamut" hereinafter), and a solid-line triangle represents an example of the gamut of input signals (to be referred to as an "input gamut" hereinafter). Assume that the output gamut is broader than the input gamut in the gamuts of green G—cyan G and red R—magenta M, and the output and input gamuts nearly match in the gamut of red R—green G.

When the image output device has the output gamut shown in FIG. 15A, colors which belong to the gamuts of green G—cyan G and red R—magenta M are reproducible if they fall within the output gamut even when these colors deviate from the input gamut as a result of chroma emphasis. On the other hand, when colors which belong to the gamut of red R—green G deviate from the input gamut as a result of chroma emphasis, color saturation occurs upon reproduction. Therefore, the hue of the input RGB signals is detected, and if the detected hue belongs to an area corresponding to a broad output gamut, the chroma emphasis level can be strengthened.

For example, a case will be examined below wherein most of pixels of an input image are color A shown in FIG. 15A. Color A shifts in the direction of the arrow by chroma emphasis, and color A after chroma correction deviates from the input gamut. However, since the output gamut is broader than the input gamut in this hue area, color A after correction is reproducible without causing any color saturation. Put differently, color A can undergo chroma correction without suppressing the chroma gain.

Therefore, in the third embodiment, since a histogram which is weighted according to the hue levels in consideration of the output gamut is generated, determining whether color saturation occurs easily by chroma correction, thereby controlling the chroma gain correction coefficient k'.

The weight detector 14 sets the weight value W depending on which color components indicate the maximum value Max and middle value Mid. That is, the hue levels of the input RGB signals can be detected based on Cmax and Cmid. For example, when Cmax indicates red R, and Cmid indicates blue B, the hue of that pixel is red R—magenta M, and belongs to an area 70 shown in FIG. 15A.

The weight detector 14 sets the weight value W as follows. For example, when Cmax indicates R and Cmid indicates B, the detector 14 determines that the hue of that pixel belongs to the area 70, and sets a weight value W=1. On the other hand, when Cmax indicates G and Cmid indicates R, the detector 14 determines that the hue of that pixel belongs to an area 71, and sets a weight value W=4. Since the hue of the area 71 is green G—yellow Y, and this hue area is nearly the same as the output and input gamuts, if chroma emphasis is applied, a color near the boundary of the input gamut readily causes color saturation. FIG. 15B shows a setting example of weight values W in case of the relationship between the output and input gamuts shown in FIG. 15A. In FIG. 15B, the weight value W for a hue area which readily causes color saturation by chroma emphasis is set to be a large value, and that of a hue area which causes little color saturation is set to be a small value.

The histogram counter 15 determines a divided block of the 2D histogram shown in FIG. 4, to which the input RGB signals belong, based on the maximum value Max and minimum value Min, and counts up the frequency of occurrence of the determined divided block by a value corresponding to a weight W. For example, when the input RGB signals are (R, G, B)=(100, 200, 50), Max=200, Max−Min=150, Cmax=G, and Cmid=R, the weight detector 14 outputs a weight value W=4, in accordance with the table shown in FIG. 15B. The histogram counter 15 counts up the frequency of occurrence of the divided block 21 of the 2D histogram shown in FIG. 4 by the weight value W=4.

In this manner, the histogram counter 15 generates a 2D histogram by adding the weight values according to the hue areas to which the input RGB signals belong. The sum total of frequencies of occurrence of the 2D histogram becomes larger with increasing number of RGB signals which belong to the hue area with a large weight value W. The weight value W becomes larger for a hue area which readily deviates from the output gamut as a result of chroma emphasis—that is, a hue area which readily causes color saturation. For this reason, the sum total of frequencies of occurrence of the 2D histogram generated by the histogram counter 15 becomes larger as the number of pixels (RGB signals) increases in the hue area that readily causes color saturation.

The normalization unit 12 receives the 2D histogram, and normalizes the 2D histogram according to the resolution of the input image, as in the first embodiment. However, when the weight value W of all pixels for one frame is 4, the unit 12 normalizes the 2D histogram so that the sum total of frequencies of occurrence of the 2D histogram after normalization becomes 255.

The saturation calculator 103 calculates the ease of saturation S as in the first embodiment. In case of a low-chroma image in which all pixels for one frame belong to the divided block 23 shown in FIG. 5, the ease of saturation S assumes the value zero. On the other hand, in the case of a high-chroma image in which all pixels for one frame belong to the divided block 20 shown in FIG. 5, since the sum total of frequencies of occurrence is 255, the ease of saturation S assumes 1020 (=255×4).

FIG. 16 shows the conversion characteristics of the gain table 104. In order to yield a result close to the case of the chroma gain k=1.5, when the ease of saturation S is zero as in the first embodiment, k'is set to 0.5, when $U_1=2U$ and $V_1=2V$. With the characteristics shown in FIG. 16, the chroma gain correction coefficient k' monotonically decreases with increasing ease of saturation S.

The gamut corrector 108 converts R'G'B' signals output from the chroma corrector 107 into R"G"B" signals according to a device color space (output gamut) of the image output device. The R'G'B' signals are data which depends on the color space of the input signals, and includes data that deviates from the input gamut after chroma correction. The data which deviates from the input gamut is expressed as underflow data (negative values) or overflow data that exceeds 255. The gamut corrector 108 converts the R'G'B' signals including the underflow and overflow data into R"G"B" signals of the device color space in which these R'G'B' signals fall within a predetermined range (e.g., 0, to 255), and outputs the R"G"B" signals. This conversion may use 3×3, matrix operations or an LUT.

As described above, according to the third embodiment, the chroma gain k can be controlled in accordance with the ease of saturation S calculated from the relationship between the chroma and luminance levels as in the first and second embodiments. Furthermore, by controlling the chroma gain correction coefficient k' by generating a 2D histogram that takes the relationship between the output and input gamuts into account, chroma correction that effectively uses the output gamut of the image output device can be implemented.

Fourth Embodiment

An image processing apparatus according to the fourth embodiment of the present invention will be described hereinafter. Note that the same reference numerals in the fourth embodiment denote the same components as those in the first to third embodiments, and a detailed description thereof will not be repeated.

Figure 17:
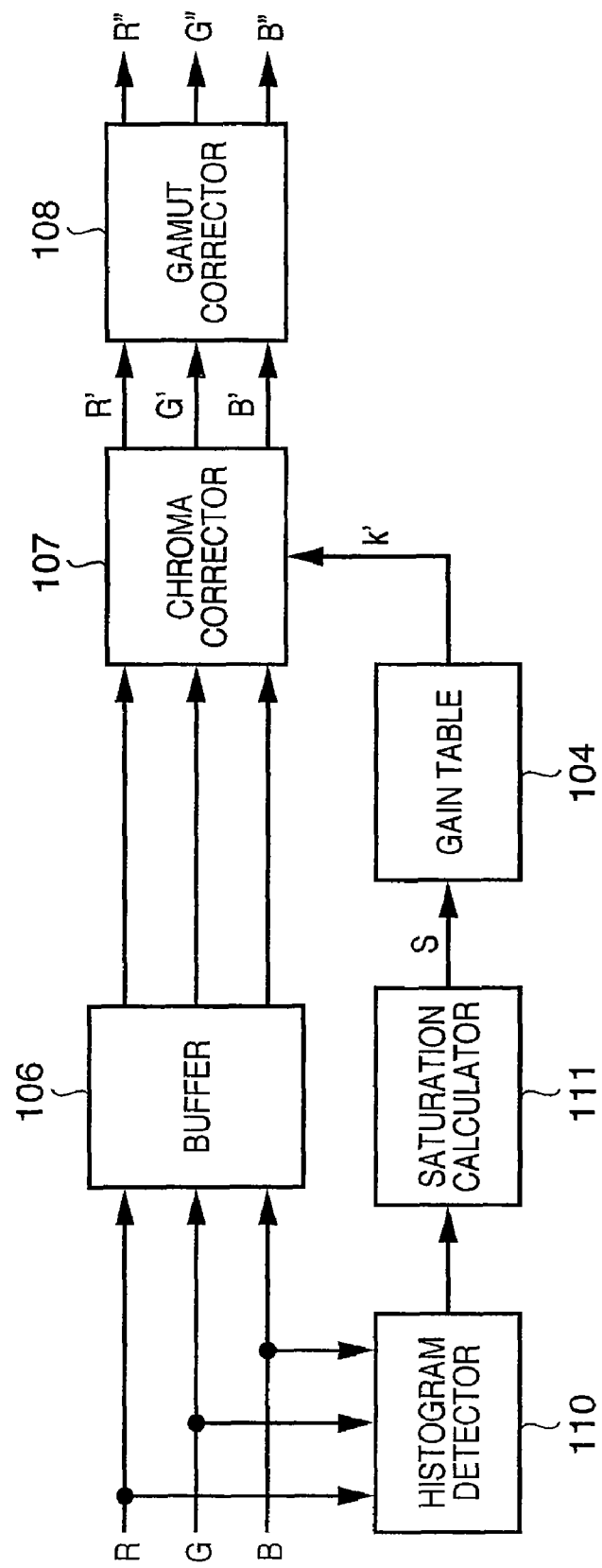
FIG. 17 is a block diagram showing the arrangement of an image processing apparatus according to the fourth embodiment.

The fourth embodiment will explain an example in which chroma correction is applied in consideration of the gamut of an image output device such as a display device or the like, as in the third embodiment. FIG. 17 is a block diagram showing the arrangement of an image processing apparatus according to the fourth embodiment. Differences from the arrangement of the second and third embodiments are a histogram detector 110 and saturation calculator 111.

Figure 18:
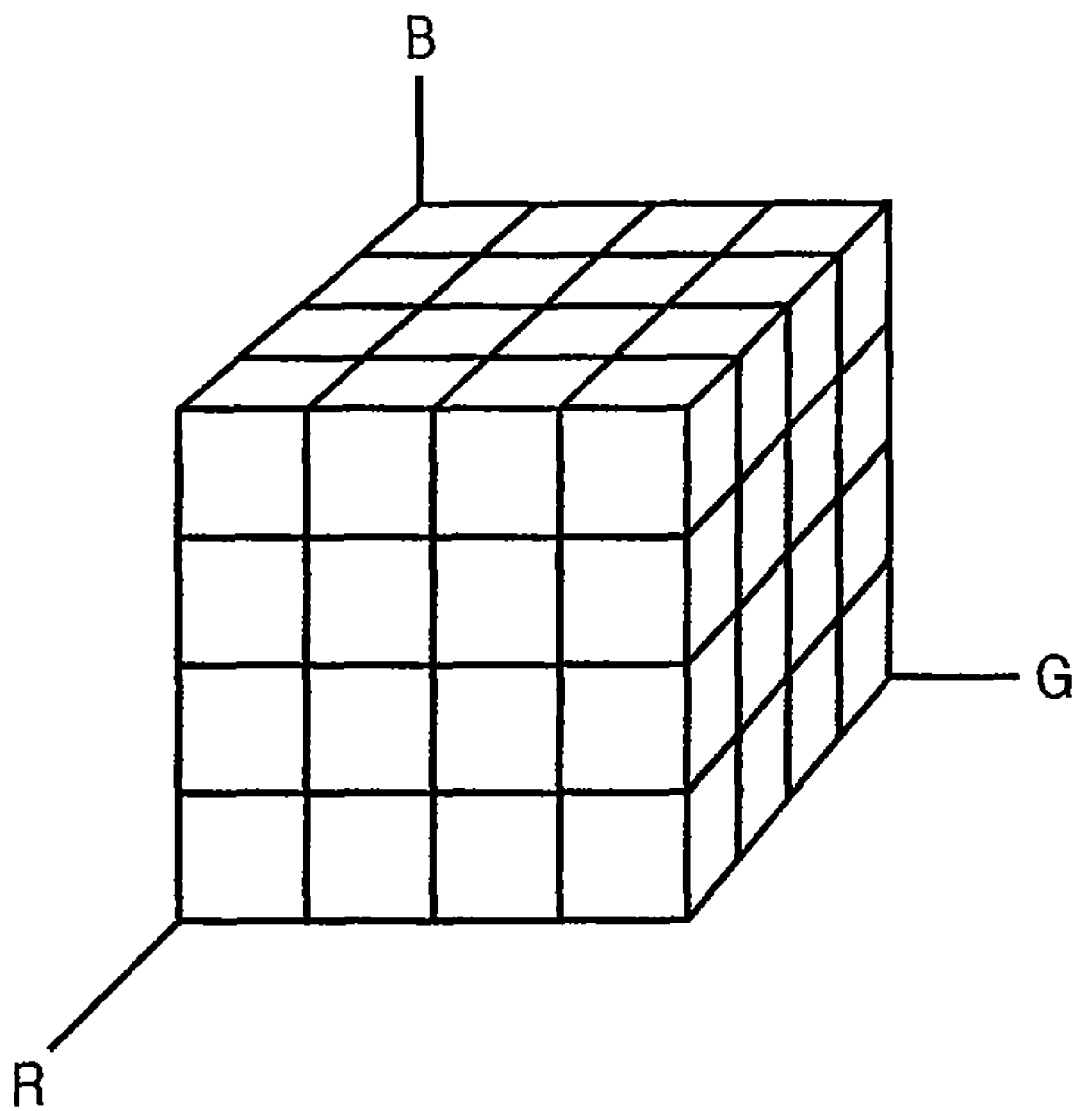
FIG. 18 shows divided blocks obtained by nearly uniformly dividing an RGB three-dimensional (3D) space.

The histogram detector 110 counts frequencies of occurrence of divided blocks obtained by nearly uniformly dividing an RGB 3D space shown in FIG. 18. The detector 110 divides the respective axes of RGB into four, in other words into, 0, to 63, 64, to 127, 128, to 191, and 192, to 255, and counts the frequencies of occurrence for 64, (=$4^3$) divided blocks.

The histogram detector 110 comprises the normalization unit 12 as in the first to third embodiments, and normalizes the frequencies of occurrence of the respective divided blocks of the 3D histogram by the number of pixels for one frame. In the fourth embodiment, the 3D histogram is normalized so that the sum total of frequencies of occurrence after normalization is 63.

Figure 19:
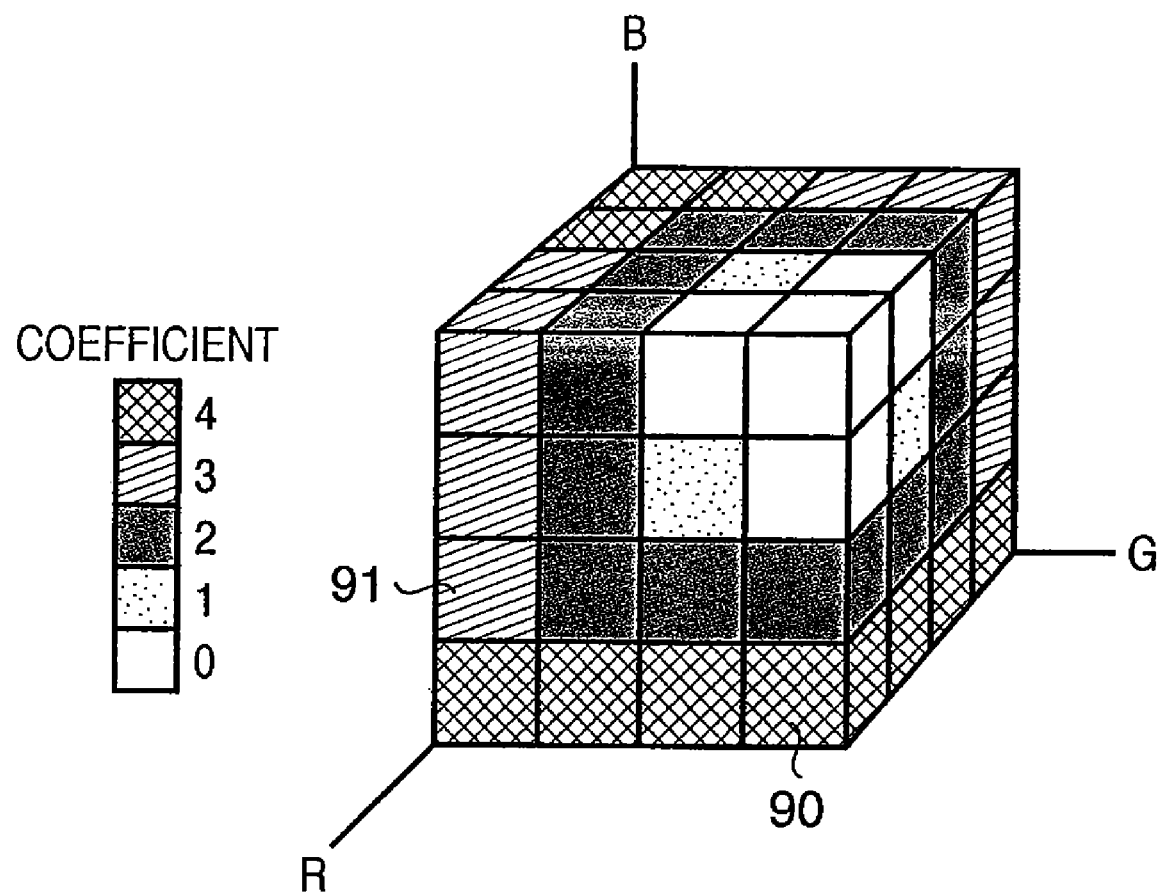
FIG. 19 is a graph showing the relationship between the divided blocks of the 3D histogram and coefficients.

FIG. 19 shows the relationship between the divided blocks of the 3D histogram and coefficients. The saturation calculator 111 multiplies the frequencies of occurrence of the respective divided blocks of the 3D histogram by coefficients shown in FIG. 19, and calculates the sum total of these frequencies of occurrence, thus calculating the ease of saturation S. The coefficient values assume larger values for divided blocks which suffer larger influences of color saturation upon chroma emphasis, in consideration of the output gamut. Therefore, the coefficient is set as a large value for a hue area corresponding to a small difference between the input and output gamuts, and is set as a small value for a hue area in which the output gamut is broader than the input gamut.

The coefficients shown in FIG. 19 are set under the assumption of the relationship between the input and output gamuts shown in FIG. 15A. For example, a maximum coefficient=4, is assigned to a divided block 90 (R=192, to 255, G=192, to 255, B=0, to 63) shown in FIG. 19. This is because the influence of color saturation readily occurs since a color corresponding to the divided block 90 is high-chroma yellow, and the input and output gamuts nearly match. On the other hand, a divided block 91 (R=192, to 255, G=0, to 63, B=64, to 127) corresponds to a high-chroma color. However, since the divided block 91 belongs to a hue area of red R—magenta M in which the output gamut is broader than the input gamut, a coefficient=3, is assigned to this divided block. Note that the coefficients of divided blocks near a neutral color axis which are joined by (R, G, B)=(0, 0, 0) and (255, 255, 255) are set to be zero.

The saturation calculator 111 multiplies the frequencies of occurrence of the 64, divided blocks by their coefficients, and calculates the sum total of the frequencies of occurrence of all the divided blocks, thus calculating the ease of saturation S (equation (1)).

As described above, according to the fourth embodiment, as in the third embodiment, by controlling the chroma gain correction coefficient k' by generating a 3D histogram that takes the relationship between the output and input gamuts into account, chroma correction that effectively uses the output gamut of the image output device can be implemented.

Fifth Embodiment

An image processing apparatus according to the fifth embodiment of the present invention will be described hereinafter. Note that the same reference numerals in the fifth embodiment denote the same components as those in the first to fourth embodiments, and a detailed description thereof will not be repeated.

The fifth embodiment will explain an example in which the saturation calculator 111 of the fourth embodiment calculates the ease of saturation S by another method.

Figure 20:
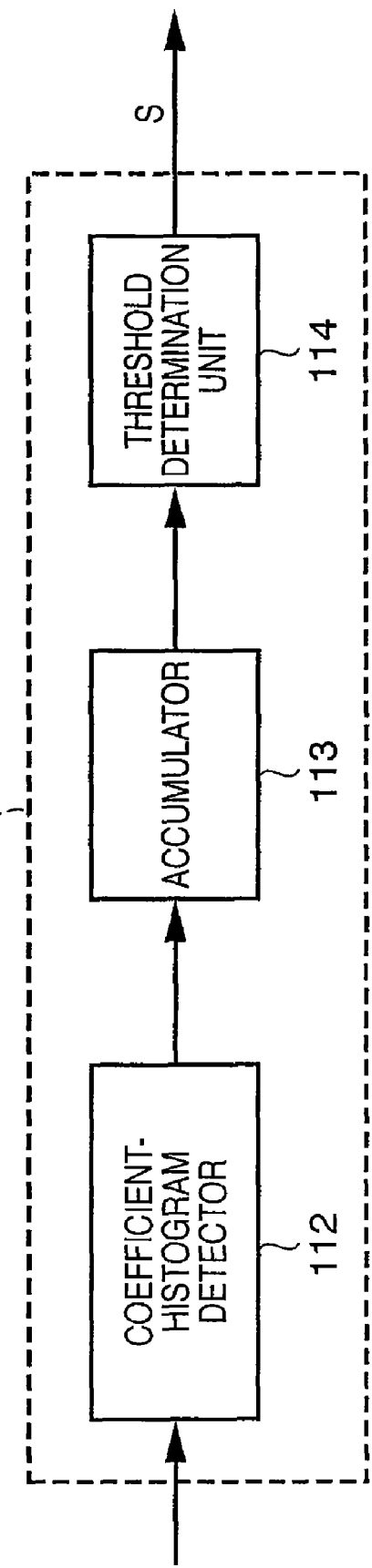
FIG. 20 is a block diagram showing the arrangement of a saturation calculator according to the fifth embodiment.

FIG. 20 is a block diagram showing the arrangement of the saturation calculator 111.

Figure 21A:
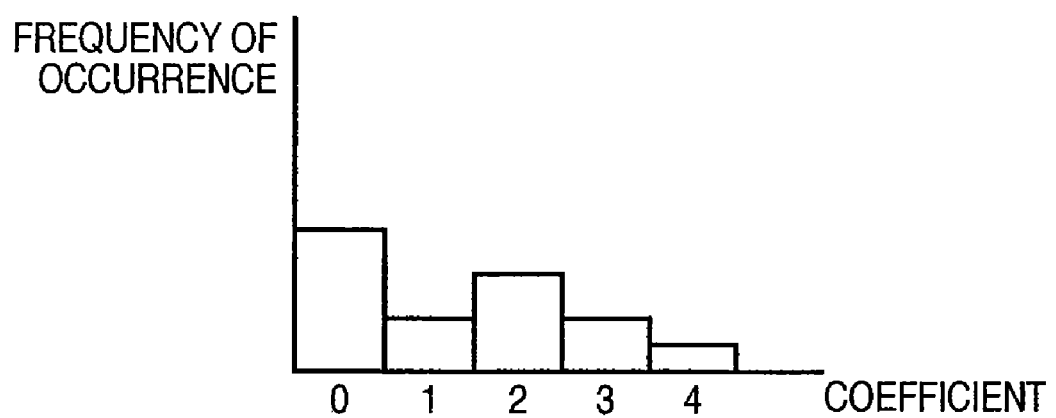
FIG. 21A is a graph for explaining a coefficient histogram.

A coefficient-histogram detector 112 generates a coefficient histogram shown in FIG. 21A from the 3D histogram. The coefficient histogram is generated by counting the frequencies of occurrence for respective coefficients 0 to 4. In the coefficient histogram, the frequency of occurrence of the coefficient=4, is the sum of the frequencies of occurrence of the divided blocks to which the coefficient=4, is assigned. Of course, the sum total of frequencies of occurrence of the coefficient histogram equals that of frequencies of occurrence of the 3D histogram.

Figure 21B:
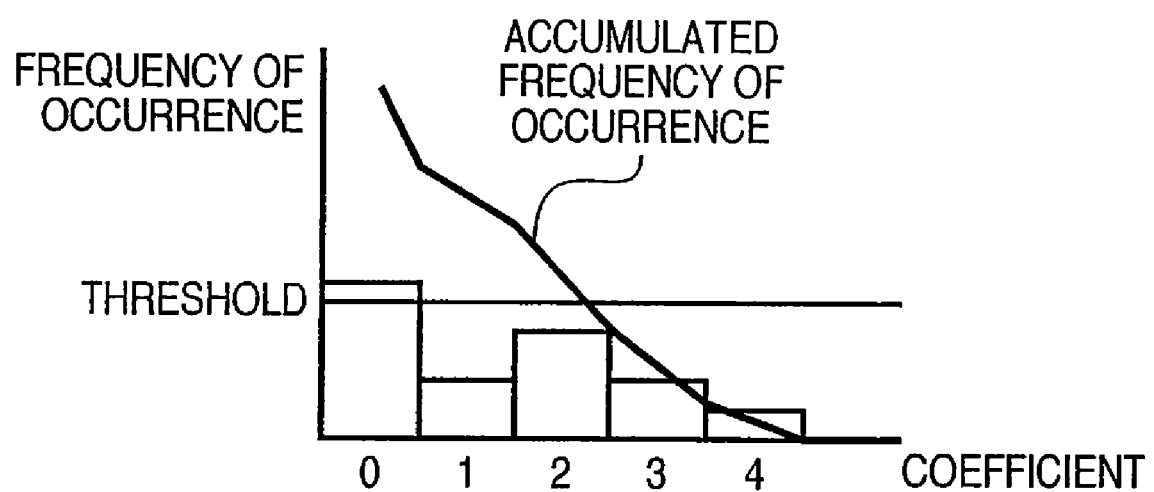
FIG. 21B is a graph showing the accumulated state of the frequencies of occurrence of the coefficient histogram shown in FIG. 21A.

An accumulator 113 receives the coefficient histogram, and accumulates the frequencies of occurrence in descending order of coefficient. FIG. 21B shows the accumulated state of the frequencies of occurrence of the coefficient histogram shown in FIG. 21A.

A threshold determination unit 114 compares the accumulated frequencies of occurrence with a predetermined threshold to detect a coefficient, the accumulated frequency of occurrence of which becomes greater than or equal to the threshold, and outputs the detected coefficient as the ease of saturation S. In the example shown in FIG. 21B, the coefficient whose accumulated frequency of occurrence becomes greater than or equal to the threshold is 2, and the ease of saturation S=2, is output. Therefore, the ease of saturation ranges from 0, to 4.

Figure 22:
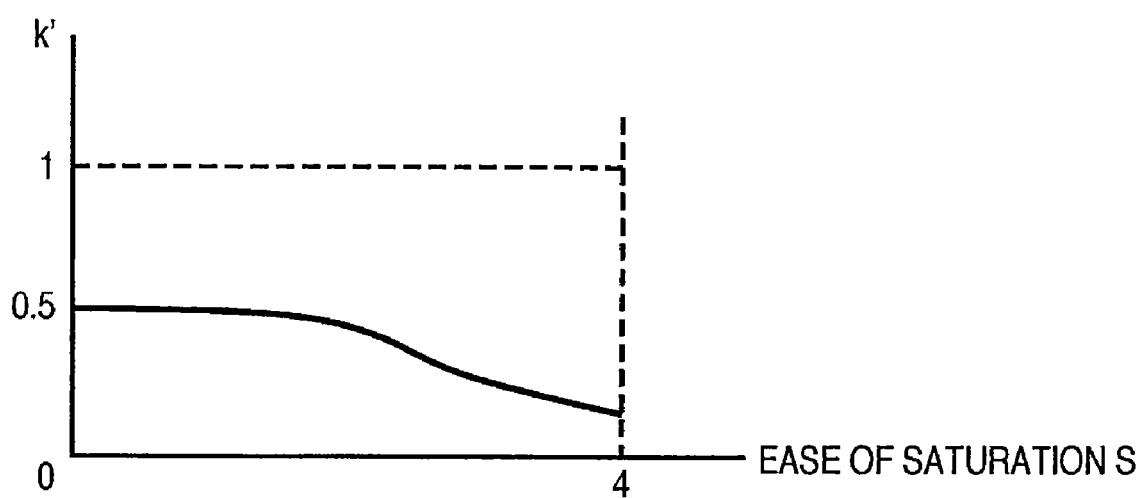
FIG. 22 is a graph showing the conversion characteristics of a gain table.

FIG. 22 shows the conversion characteristics of the gain table 104. In order to yield a result close to the case of the chroma gain k=1.5, when the ease of saturation S is zero as in the first embodiment, k' is set to 0.5, when $U_1=2U$ and $V_1=2V$. With the characteristics shown in FIG. 22, the chroma gain correction coefficient k' monotonically decreases with increasing ease of saturation S.

Sixth Embodiment

An image processing apparatus according to the sixth embodiment of the present invention will be described hereinafter. Note that the same reference numerals in the sixth embodiment denote the same components as those in the first to fifth embodiments, and a detailed description thereof will not be repeated.

The sixth embodiment will explain an example in which the coefficients used by the saturation calculator 111 are different from those of the fourth embodiment.

Figure 23:
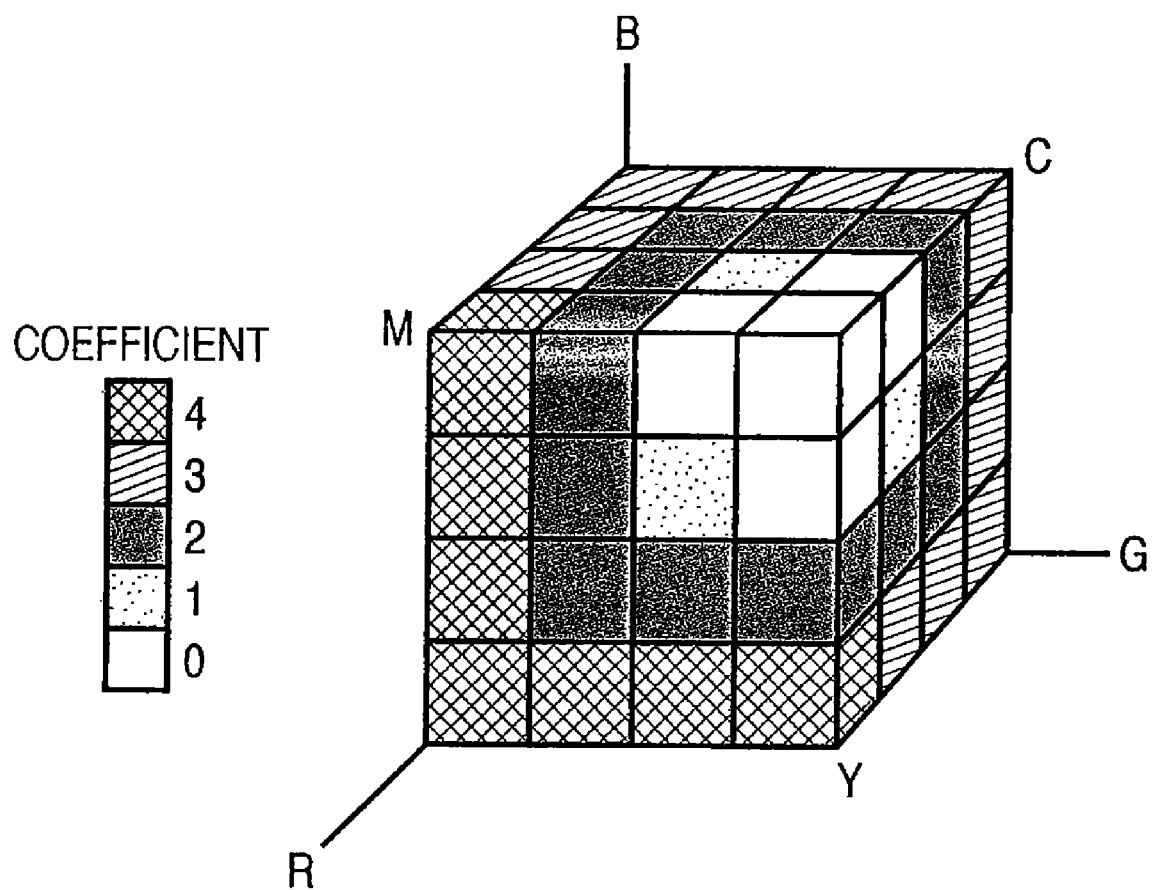
FIG. 23 is a graph showing the relationship between the divided blocks of a 3D histogram and coefficients according to the sixth embodiment.

FIG. 23 shows the relationship between the divided blocks of the 3D histogram and coefficients according to the sixth embodiment. In the sixth embodiment, a coefficient is set according to a predetermined color irrespective of the output gamut. For example, a coefficient for a high-chroma area part of red R is set to be large, in particular to eliminate color saturation of R. In the example of FIG. 23, coefficients for high-chroma parts of hue areas of red R—magenta M and red R—yellow Y are set as large as 4, and coefficients for high-chroma parts of other hue areas magenta M—blue B, blue B—cyan C, cyan C—green G, and green G—yellow Y are set as small as 3.

The present inventors obtained the following findings by examining image characteristics. Red R frequently appears in images including many details like clothing and flowers. Blue B frequently appears in images including a few details like sky and sea. Green G appears in many images of plants, which do not include so much high-chroma images. Based on such findings, by setting a large coefficient for a hue area centering on red R, an effect of reducing loss of details due to color saturation can be obtained. Of course, the settings of the coefficients shown in FIG. 23 are merely an example, and the present invention is not limited to such a specific example.

In this manner, color saturation of a desired color can be selectively reduced upon chroma correction.

Exemplary Embodiments

The present invention can be applied to a system constituted by a plurality of devices (e.g., host computer, interface, reader, printer) or to an apparatus comprising a single device (e.g., copying machine, facsimile machine).

Further, the present invention can provide a storage medium storing program code for performing the above-described processes to a computer system or apparatus (e.g., a personal computer), reading the program code, by a CPU or MPU of the computer system or apparatus, from the storage medium, then executing the program.

In this case, the program code read from the storage medium realizes the functions according to the embodiments.

Further, the storage medium, such as a floppy disk, a hard disk, an optical disk, a magneto-optical disk, CD-ROM, CD-R, a magnetic tape, a non-volatile type memory card, and ROM can be used for providing the program code.

Furthermore, besides above-described functions according to the above embodiments can be realized by executing the program code that is read by a computer, the present invention includes a case where an OS (operating system) or the like working on the computer performs a part or entire processes in accordance with designations of the program code and realizes functions according to the above embodiments.

Furthermore, the present invention also includes a case where, after the program code read from the storage medium is written in a function expansion card which is inserted into the computer or in a memory provided in a function expansion unit which is connected to the computer, CPU or the like contained in the function expansion card or unit performs a part or entire process in accordance with designations of the program code and realizes functions of the above embodiments.

In a case where the present invention is applied to the aforesaid storage medium, the storage medium stores program code corresponding to the flowcharts described in the embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-247356, filed Sep. 12, 2006, which is hereby incorporated by reference herein in its entirety.

What is claimed is:

1. An image processing apparatus comprising:
    a generator, arranged to input image data constructed by plural pixels, each of which is represented by RGB signals, and to generate a two-dimensional histogram which indicates relation between values corresponding to luminance and chroma of the image data based on the RGB signals of the plural pixels, the two-dimensional histogram has blocks to divide value ranges of color component signals of the RGB signals into a predetermined number of divisions;
    a calculator, arranged to calculate an ease of saturation, which indicates easiness for color saturation to occur when chroma emphasis is performed on the image data, using frequencies of occurrence of respective blocks of the two-dimensional histogram and coefficients for the respective blocks;
    a determiner, arranged to determine a gain for adjusting degree of the chroma emphasis from the ease of saturation so as to restrain the color saturation when the chroma emphasis is performed on the image data; and
    a corrector, arranged to perform chroma correction on the image data using the gain,
    wherein said generator detects a color component signal having a maximum value and a color component signal having a minimum value from the RGB signals in each pixel, and generates the two-dimensional histogram using the maximum value as the value corresponding to the luminance, and a difference between the maximum value and the minimum value as the value corresponding to the chroma,
    wherein each coefficient corresponding to each block is set from relation between luminance and chroma corresponding to the block and a color gamut where the RGB signals can represent so as to calculate the easiness of color saturation when the chroma emphasis is performed on a pixel having RGB signals included in the value ranges of the block.

2. The apparatus according to claim 1, wherein said determiner determines the gain based on a characteristic set so that the gain decreases with increasing the ease of saturation.

3. A control method of an image processing apparatus comprising the steps of:
    inputting image data constructed by plural pixels, each of which is represented by RGB signals, and generating a two-dimensional histogram which indicates relation between values corresponding to luminance and chroma of image data based on the RGB signals of the plural pixels, the two-dimensional histogram has blocks to divide value ranges of color component signals of the RGB signals into a predetermined number of divisions;
    calculating by a processor an ease of saturation, which indicates easiness for color saturation to occur when chroma emphasis is performed on the image data, using frequencies of occurrence of respective blocks of the two-dimensional histogram and coefficients for the respective blocks;
    determining a gain for adjusting degree of the chroma emphasis from the ease of saturation so as to restrain the color saturation when the chroma emphasis is performed on the image data; and
    performing chroma correction on the image data using the gain,
    wherein a color component signal having a maximum value and a color component signal having a minimum value are detected from the RGB signals in each pixel, and the two-dimensional histogram is generated using the maximum value as the value corresponding to the luminance, and a difference between the maximum value and the minimum value as the value corresponding to the chroma,
    wherein each coefficient corresponding to each block is set from relation between luminance and chroma corresponding to the block and a color gamut where the RGB signals can represent so as to calculate the easiness of color saturation when the chroma emphasis is performed on a pixel having RGB signals included in the value ranges of the block.

4. The method according to claim 3, wherein the gain is determined based on a characteristic set so that the gain decreases with increasing the ease of saturation.

* * * * *